United States Patent [19]

Haddad et al.

[11] 4,377,389

[45] * Mar. 22, 1983

[54] DIP DYEING OF PLASTIC ARTICLES AND THE DYE BATH COMPOSITION THEREOF

[75] Inventors: Theodore A. Haddad; Walter Kondig, both of Leominster; Richard A. Phillips, Acton, all of Mass.

[73] Assignee: Foster Grant Corporation, Leominster, Mass.

[*] Notice: The portion of the term of this patent subsequent to Jan. 20, 1998, has been disclaimed.

[21] Appl. No.: 209,083

[22] Filed: Nov. 21, 1980

Related U.S. Application Data

[63] Continuation-in-part of Ser. No. 102,695, Dec. 12, 1979, Pat. No. 4,245,991.

[51] Int. Cl.$^3$ ............................................. D06P 3/00
[52] U.S. Cl. .......................................... 8/506; 8/611; 8/657; 8/938
[58] Field of Search ................... 8/506, 519, 509, 611, 8/657, 938

[56] References Cited

U.S. PATENT DOCUMENTS

| | | | |
|---|---|---|---|
| 2,461,612 | 2/1949 | Olpin et al. | 8/512 |
| 2,882,119 | 4/1959 | Laucius et al. | 8/512 |
| 3,771,949 | 11/1973 | Hermes | 8/492 |
| 3,901,648 | 8/1975 | Arbaud | 8/515 |
| 3,954,864 | 5/1976 | Hardouin et al. | 564/269 |
| 3,989,452 | 11/1976 | Hugelshofer | 8/527 |
| 4,043,637 | 8/1977 | Hovey | 350/160 P |
| 4,076,496 | 2/1978 | Hamano | 8/509 |
| 4,115,054 | 9/1978 | Hermes | 8/492 |
| 4,176,361 | 11/1979 | Kawada et al. | 106/20 |
| 4,245,991 | 1/1981 | Haddad et al. | 8/506 |

*Primary Examiner*—A. Lionel Clingman
*Attorney, Agent, or Firm*—Tatsuya Ikeda

[57] ABSTRACT

Dyeing of plastic articles, particularly sunglass lenses is conducted by use of a dye bath composition comprising a dye and a mixed solvent. At least about 70 weight % of the mixed solvent consists of glycerol and ethylene glycol whose relative ratio is in the range of from 95:5 to 20:80. The dyeing method and the dye bath composition are very advantageous for manufacturing sunglass lenses having high optical and aesthetic quality, particularly for dyeing hard-coated polarized lenses.

21 Claims, No Drawings

DIP DYEING OF PLASTIC ARTICLES AND THE DYE BATH COMPOSITION THEREOF

BACKGROUND OF THE INVENTION

This application is a continuation-in-part of U.S. application Ser. No. 102,695, filed Dec. 12, 1979, now U.S. Pat. No. 4,245,991.

The present invention relates to an improved method of dyeing plastic articles such as sheets, and particularly those having an abrasion-resistant hard surface coating thereon. The invention also relates to a novel dye bath composition to be used in said dyeing process.

This invention is particularly useful for dip-dyeing polarized plastic sheets having a hard coat thereon to be used, for instance, as sunglass lenses, and hence the description of the invention will be given below mainly in conjunction with such an application, but the invention is not limited thereto. Thus, uncoated CR-39 (allyl diglycol carbonate) lens blanks can also be dyed successfully by use of the dye solution of this invention, preferably at a temperature higher than those suitable for hard-coated polarized lenses.

The most common dye bath system used for dyeing polarized lenses consists primarily of a dye or dyes dispersed in water with a minor amount of organic solvent, or a mixture of organic solvents added thereto. This type of dye bath system, however, has the disadvantage that water has a marked tendency to cause hazing of the lens. Because of these disadvantages, the primarily-aqueous dye bath system is not suitable for dyeing hard-coated polarized lenses to deep shades; they can be dyed only to a light tint.

Solvents may be added to speed up the aqueous dyeing process or to permit deeper shades. However, by their nature solvents attack the surface of the lens and cause deterioration of the surface hard coat and/or the substrate (crazing, pitting, swelling, etc.).

SUMMARY OF THE INVENTION

Faced with the critical need for a dye bath system which will afford deep shade and deep-contrast gradient shade lenses, particularly hard-coated polarized lenses having desirable characteristics such as low haze, high transparency, and levelness of the color, without causing deterioration of the surface coat or the substrate, a dye bath composition suitable for said purpose has now been discovered comprising a dye, for instance, a disperse dye, a solvent dye, or a basic dye, and, as a solvent, a mixture of glycerol and ethylene glycol with or without a minor proportion of water or other organic solvent(s).

According to the method of this invention, hard-coated polarized lenses can be dyed to a deep shade for a full range of color tones without accompanying undesirable effects such as increase of haze, loss of transparency and deterioration of the lens material, and it affords dyed sunglass lenses of high optical quality. It does not cause swelling, crazing, pitting, softening or hardening of the lens material to any objectionable extent. The dyed lens surface is smooth and the tint is very level.

DETAILED DESCRIPTION OF THE INVENTION

Many single-component organic solvent systems have been tested, but none of them gave a satisfactory result; most caused swelling, crazing or extreme softening of the polarized lens. Where glycerol alone was used as a solvent and the dyeing of a polarized lens carried out at 210°–230° F. at 4% dye concentration, a substantial degree of hardening of the lens occurred, making it more difficult to thermoform the lens subsequent to the dyeing process although no appreciable haze increase or surface degradation occurred. Where ethylene glycol alone was used and the dyeing carried out at 175°–200° F. at 4% dye concentration, the polarized lens material became more susceptible to particle imprinting during the subsequent step of thermoforming, although no appreciable haze increase or surface degradation occurred.

On the other hand, where a mixture of glycerol and ethylene glycol is used, the relative proportions of the two by weight being in the range of about 95:5 to 20:80, preferably 90:10 to 30:70, with or without the presence of a minor amount of water or other organic solvent(s) (less than 30% based on the total weight of the liquid), and the dyeing of hard-coated polarized lenses is conducted at 170°–210° F., preferably at 175°–200° F., not only haze increase and surface degradation do not occur but also the thermoforming of the lenses can be carried out in a standard production cycle with excellent results.

The term solvent is used in a loose sense throughout the specification and the claims, in that the solvent or mixed solvent as used herein does not necessarily connote that the dye bath composition is a true solution of the dye on the molecular level.

One of the factors that must be taken into consideration in choosing a suitable dyeing temperature for a given lens material and a dye bath composition is the attainment of a reasonable dyeing speed necessary for the commercial production while at the same time avoiding any impairment of the optical or aesthetic quality of the lens. From the viewpoint of commercial production, the retention of good thermoforming characteristics after dyeing is as important a consideration as optical or aesthetic properties. Examples of high optical or aesthetic properties are transparency, low haze, depth of tint and smoothness of surface appearance.

Another advantage of this invention is that no special pretreatment of lens blanks is necessary prior to dyeing and the excess dye solution adhering to the lens after dyeing can easily be rinsed off with plain water. The dye bath can be operated continuously for long periods of time with only incremental dye component additions to maintain the desired color, and solvent addition to compensate for the drag out loss.

By "lens" here is meant a sunglass lens which usually does not have an optometric effect. By "lens blank" is meant undyed lens.

By "thermoforming" is meant a process where a flat lens is transformed into a concave shape by the thermal treatment of the lens. For example, a flat dyed lens having a prescribed dimension is placed on a female die the geometry of which corresponds to a small circular segment of a sphere of a radius of, for instance, 9 cm and the lens is pressed against said female die for several minutes at a temperature of, for instance, 190°–200° F.

Methods of making polarized lenses are well known in the art. Typically, a hard-coated polarized lens consists of a layer of polyvinyl alcohol (with iodine molecules entrapped therein) at the center and, on both sides of it, a substrate layer which has a hard coat layer on its exterior surface. The polarizing polyvinyl alcohol layer is typically 0.01 inch or less in thickness. Examples of material used for the substrate layer include cellulose acetate butyrate, cellulose triacetate. The thickness of each substrate layer is typically 0.015 inch or less. Various materials can be used for the hard coating purpose, and typical examples include melamine-formaldehyde resin and polyethylene glycol dimethacrylate. The thickness of the hard coat is typically of the order of several microns or more. Thus, a hard-coated polarized lens is a multi-layer structure and it will be appreciated that dyeing such lens for the purpose of high-quality sunglass lens is generally a more demanding task than dyeing an unpolarized uncoated plastic article or lens. The term "high-quality" here includes high transparency, low haze, high polarization efficiency, light fastness, smoothness of the color and the surface, the general aesthetic appearance, and the abrasion resistance of the lens. Thus, the primary considerations to be taken into account in the dyeing of hard-coated polarized lenses are to avoid the deterioration of the hard coat layer and yet to achieve a chemical affinity between the dye molecule and the substrate material while at the same time to avoid excessive softening or hardening of the substrate material. The softening of the substrate material causes problems such as the loss of surface smoothness, deterioration of the hard coat and susceptibility to particle imprints during the thermoforming process. The hardening of the substrate material makes the thermoforming process more difficult. The dyeing process of this invention is also applicable to other organic polymer resins wherein the advantages disclosed herein are desired.

Haze and transparency of the lens reported herein are measured according to ASTM D-1003-61, "Standard Method for Test for Haze and Luminous Transmittance of Transparent Plastics".

The general dyeing procedure employed in the method of this invention is as follows: A group of polarized lenses is placed in a stainless steel tank holding the dye solution and maintained at a constant temperature. The contact time with the dye solution can vary depending, for instance, on the extent of dyeing desired, the dye concentration, the lens material, the dye material, the solvent system used, and the bath temperature. Typically, it is of the order of fifteen minutes. Immediately after the prescribed period of dyeing, the lenses are removed from the dye solution and transferred to a tap-water bath kept at room temperature for rinsing and then to a hot water bath (about 150° F.) for a second rinsing operation. After the second water rinse they are sprayed with deionized water to obtain a clean surface. Subsequently, the lenses are dried for a predetermined period of time in an air oven maintained at an elevated temperature (typically 5 minutes at 100° F.). The dyed lenses are thermoformed to produce spherically concave sunglass lenses. The above described general procedure was used in all of the examples given below.

A minor amount of water can be present in the dye bath, i.e., up to about 30% weight based on the weight of water and the organic solvents. Water, however, does not appear to have any particular advantage in the method of this invention. Moreover, non-aqueous mixtures of glycerol and ethylene glycol are not limited by the boiling point of water, i.e., the dye bath can be operated above 212° F. (100° C.) although the preferable temperature is 175°–200° F. in the case of hard-coated polarized lenses. Also with an aqueous bath rapid loss of water will occur as the bath temperature approaches its boiling point, making the maintenance of constant bath composition more difficult.

Similarly, a minor amount (less than 30 weight % based on the total mixed solvent) of other organic solvent or solvents can be present in the dye bath solution. Thus, for instance, when varying amounts of formamide were added to a 50:50 mixture of glycerol and ethylene glycol and the dyeing of a hard-coated polarized lens was tested by use of Disperse Blue #3 dye at 200° F., the dyeing result was satisfactory below 30% by weight formamide concentration, but softening of the lens and susceptibility to imprints were observed above 30%. The same trend was also observed when varying amounts of dipropylene glycol were added; the dyeing result was satisfactory below 30% dipropylene glycol concentration, but very fine pinholes were observed on the lens surface above 30%.

Many conventional dye stuffs can be used for the purpose of this invention. Many "disperse dyes" and mixtures thereof have been found satisfactory. Examples of such disperse dyes include Disperse Blue #3, Disperse Blue #14, Disperse Yellow #3, Disperse Red #13 and Disperse Red #17. Various "solvent dyes" have also been found satisfactory for the instant invention. Examples of such solvent dyes include Solvent Violet #13, Solvent Blue #59, Solvent Green #19, Solvent Yellow #14 and Solvent Red #26. Various "basic dyes" have also been found satisfactory for the purpose of this invention. Examples of such basic dyes include Basic Yellow #11, Basic Red #14, Basic Blue #3 and Basic Blue #41. The classification and designation of the dyes recited in this specification are based on "The Color Index", 3rd edition published jointly by the Society of Dyes and Colors and the American Association of Textile Chemists and Colorists (1971). Chemical identities of the above-mentioned dye stuffs can be found in said publication. Dye stuffs can generally be used either as a sole dye constituent or as a component of a dye mixture depending upon the color desired. Thus, the term dye as used herein includes dye mixture.

A typical dye concentration in the bath is 4% by weight, but there is a considerable latitude in this regard. Generally, dyes may be present in the solvent mixture at a level of about 0.2 to 15%, preferably 1 to 4%, based on the total weight of dye solution. Where a dye mixture is used and the rates of consumption of the individual dyes are different, dye components will have to be added to the bath in such a manner that their proportions in the bath remain substantially constant.

Although the method and the dye bath composition of this invention are particularly useful for dyeing hard-coated polarized lenses, this invention can be applied to the dyeing of other types of plastic articles and lenses. Thus, for instance, it can be applied to the dyeing of CR-39 lenses (allyl diglycol carbonate) and other organic polymer resins. In the case of dyeing CR-39 lenses by use of the dye solution of this invention, the preferred temperature range, however, is 250°–280° F.

We have also discovered that various organic compounds, when added to mixtures of glycerol and ethylene glycol enhance the speed of dyeing of plastic lenses, particularly hard-coated lenses. Examples of such compounds include dimethyl sulfone, methylacetamide, ethylene carbonate, pyrrolidone, N-methylformamide, pyrrolidine and ethyl lactate.

We have also discovered that this acceleration in rate in dyeing plastic lenses may be obtained with mixture of one of such solvents and glycerol. We have found that pyrrolidone is particularly advantageous for this purpose.

The following examples are given for the purpose of illustrating the present invention.

EXAMPLE 1

Without any prior treatment, about 100 pieces of lens blanks made of polarized plastic sheet comprising a polyvinyl alcohol layer, two CAB (cellulose acetate butyrate) substrate layers and two melamine-formaldehyde hard-coat layers were placed in a dye bath. The dye solution consisted essentially of (on the basis of weight percent)

4% Disperse Blue #3 (Acetoquinone Pure Blue R)
48% glycerol
48% ethylene glycol

The bath was maintained at 190° F.±2° F. by use of a thermostat-heater combination. Dyeing was continued for a period of 15 minutes, and thereafter the lenses were removed from the bath, rinsed with tap water, rinsed with deionized water and dried in an oven at 100° F. for 5 minutes. The lenses were subsequently thermoformed at 190° F. for 2 minutes on a metal die.

The depth of the tinting was satisfactory, the transmission of the dyed lenses being about 13%. The average haze was about 1%. No dyeing defect objectionable from the standpoint of the aesthetic appearance of the sunglasses was observed.

EXAMPLE 2

The same procedure as used in Example 1 was repeated using Disperse Yellow #3. (Acetoquinone Yellow 4JLZ). The dyed lenses were quite satisfactory. The average transmission was about 13% and the average haze about 1%. There was no objectionable dyeing defect.

EXAMPLE 3

The same procedure as used in Example 1 was repeated using Disperse Red #17 (Acetoquinone Red BZ). The dyed lenses were again quite satisfactory, the average transmission and haze being again about 13% and 1% respectively.

EXAMPLE 4

Dyeing of the same hard-coated polarized lens as used in Examples 1-3 was attempted by use of a primarily aqueous dye bath system.

The dye bath consisted essentially of:
distilled water
2.5 wt % blue mixed dye (the predominant component was Disperse Blue #14)
8 wt % mixed organic solvent (the predominant component was ethyl-L-lactate)

In order to maintain the haze level below 3.8%, the transmission of the dyed lenses had to be held at 19-24%. The dyeing was carried out at 160° F. for 10 minutes. About 16% of the dyed lenses were defective because of dyeing defects.

EXAMPLE 5

The same procedure as described in Example 4 was repeated using a yellow dye mixture, the predominant component of which was:

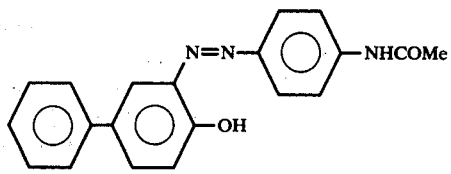

The result was essentially the same as Example 4.

EXAMPLE 6

The same procedure as described in Example 4 was repeated using a red dye mixture whose predominant component was Disperse Red #13. The result was essentially the same as Example 4.

EXAMPLE 7

The dyeing of hard-coated polarized lenses described in Example 1 was carried out in a glycerol bath containing 4 weight % of the dye powder used in Example 1. The temperature was 210°-230° F. and the dyeing time 25 minutes. Although no haze increase or surface degradation occurred, it was difficult to thermoform the lenses after the dyeing due to hardening of the lens. The same result was obtained when the experiment was repeated using the dyes of Examples 2-6.

EXAMPLE 8

The dyeing of hard-coated polarized lenses described in Example 1 was carried out in an ethylene glycol bath containing 4 weight % of the dye powder used in Example 1. The temperature was 175°-200° F. and the dyeing time 30 minutes. Although no haze increase or surface degradation occurred, the lenses became more susceptible to particle imprints during the subsequent thermoforming step due to softening of the material. The same result was obtained when the experiment was repeated using the dyes of Examples 2-6.

EXAMPLE 9

Where dyeing of hard-coated polarized lens of Example 1 was attempted using a single component organic solvent bath, the results were generally unsatisfactory. Thus, where formamide was used at 170° F., severe pits developed in the lens surface, where dipropylene glycol was used at 185° F. a severe "orange peel" occurred, and where trichloroethylene was used surface cracks were observed.

EXAMPLE 10

Polarized lens blanks having polyethylene glycol dimethacrylate hard coat and CAB substrate were dyed by use of the same dye solution and the procedure described in Example 1. The dyeing result was satisfactory and comparable in quality to that obtained on the lenses of Example 1.

EXAMPLE 11

The experiment described in Example 1 was further repeated under the same conditions except that the relative weight ratio between glycerol and ethylene glycol was varied to 90:10, 67:33 and 33:67. The results obtained were all satisfactory.

EXAMPLE 12

The experiment described in Example 1 was further repeated under substantially the same condition, except that, in lieu of Disperse Blue #3, various solvent dyes were used, namely, Solvent Red #26, Blue #59, Yellow #14, Green #19 and Violet #13. The results were all satisfactory.

EXAMPLE 13

The experiment described in Example 1 was further repeated under substantially the same condition, except that, in lieu of Disperse Blue #3, various basic dyes were used, namely, Basic Yellow #11, Basic Red #14, Basic Blue #3 and Basic Blue #41. The results were all satisfactory.

We claim:

1. A dye bath composition comprising a dye and a mixed solvent, said mixed solvent comprising about 70 to about 100 weight percent of glycerol and ethylene glycol in a relative weight ratio in the range of from about 95:5 to about 20:80.

2. A dye bath composition of claim 1, wherein the concentration of the dye is in the range of from about 0.2 to about 15 weight percent based on the total weight of the dye bath composition.

3. A dye bath composition of claim 1, wherein the mixed solvent is substantially free of water.

4. A dye bath composition of claim 3, wherein the mixed solvent consists essentially of glycerol and ethylene glycol.

5. A dye bath composition according to any of claims 1, 2, 3, or 4 wherein the dye is a solvent dye.

6. A dye bath composition according to any of claims 1, 2, 3, or 4 wherein the dye is a basic dye.

7. A dye bath composition according to any of claims 1, 2, 3 or 4 wherein the relative weight ratio between glycerol and ethylene glycol is in the range of from about 90:10 to about 30:70.

8. A dye bath composition according to claim 7, wherein the dye concentration is in the range of from about 1 to about 4 percent based on the total weight of the dye bath composition.

9. A dye bath composition according to claim 8 wherein the dye is selected from disperse dyes, solvent dyes, and basic dyes.

10. A process of dyeing an organic polymer resin comprising contacting said resin with a dye bath composition comprising a dye and a mixed solvent, said mixed solvent comprising about 70 to about 100 weight percent of glycerol and ethylene glycol wherein the relative weight ratio between the said glycerol and said ethylene glycol is in the range of about 95:5 to about 20:80.

11. A process of dyeing an organic polymer resin according to claim 10 wherein the concentration of the dye is from about 0.2 to about 15 weight percent based on the total weight of the dye bath composition.

12. A process of dyeing an organic polymer resin according to claim 10 wherein the dye bath composition is substantially free of water.

13. A process of dyeing an organic polymer resin according to claim 12 wherein the mixed solvent consists essentially of glycerol and ethylene glycol.

14. A process of dyeing an organic polymer resin according to any of claims 10, 11, 12 or 13 wherein the dye is a solvent dye.

15. A process of dyeing an organic polymer resin according to any of claims 10, 11, 12 or 13 wherein the dye is a basic dye.

16. A process of dyeing an organic polymer resin according to any of claims 10, 11, 12 or 13 wherein the relative weight ratio between glycerol and ethylene glycol is in the range of from about 90:10 to about 30:70.

17. A process of dyeing an organic polymer resin according to claim 16 wherein the dye concentration is in the range of about 1 to about 4 percent based on the total weight of the dye solution.

18. A process according to any of claims 10, 11, 12 or 13 wherein said organic polymer resin is a plastic sunglass lens.

19. A process according to any of claims 10, 11, 12 or 13 wherein said organic polymer resin is a polarized sunglass lens having a hard coat on the surface.

20. A process according to any of claims 10, 11, 12 or 13 wherein said organic polymer resin is allyl diglycol carbonate.

21. A process of dyeing an organic polymer resin according to claim 17 wherein the dye is selected from disperse dyes, solvent dyes and basic dyes.

* * * * *